United States Patent
Bourzier

(10) Patent No.: US 8,346,517 B2
(45) Date of Patent: Jan. 1, 2013

(54) METHOD AND A SYSTEM FOR VALIDATING AN INERTIAL UNIT OF A MOVING BODY

(75) Inventor: Laurent Bourzier, Bourges (FR)

(73) Assignee: MBDA France, Paris (FR)

( * ) Notice: Subject to any disclaimer, the term of this patent is extended or adjusted under 35 U.S.C. 154(b) by 142 days.

(21) Appl. No.: 12/866,232

(22) PCT Filed: Feb. 6, 2009

(86) PCT No.: PCT/FR2009/050185
§ 371 (c)(1),
(2), (4) Date: Feb. 6, 2009

(87) PCT Pub. No.: WO2009/101338
PCT Pub. Date: Aug. 20, 2009

(65) Prior Publication Data
US 2011/0082674 A1 Apr. 7, 2011

(30) Foreign Application Priority Data

Feb. 8, 2008 (FR) ...................................... 08 50793

(51) Int. Cl.
*G06F 17/50* (2006.01)
(52) U.S. Cl. ............... 703/2; 703/8; 701/470; 701/477; 701/479; 342/357.31; 342/358.462
(58) Field of Classification Search .................. 703/2, 8; 701/470, 477, 479; 342/357.31, 358, 462
See application file for complete search history.

(56) References Cited

U.S. PATENT DOCUMENTS

| 3,782,167 A | | 1/1974 | Stuelpnagel .................. 73/1.77 |
| 3,996,590 A | * | 12/1976 | Hammack ..................... 342/465 |
| 4,894,662 A | * | 1/1990 | Counselman ............. 342/357.25 |
| 5,922,041 A | | 7/1999 | Anderson ..................... 701/200 |
| 6,298,318 B1 | | 10/2001 | Lin ................................ 703/23 |
| 6,735,523 B1 | * | 5/2004 | Lin et al. ....................... 701/470 |

FOREIGN PATENT DOCUMENTS
EP 1 909 067 A 4/2008

OTHER PUBLICATIONS

International Search Report as issued for PCT/FR2009/050185, dated Sep. 4, 2009.

* cited by examiner

*Primary Examiner* — Thai Phan
(74) *Attorney, Agent, or Firm* — Pillsbury Winthrop Shaw Pittman, LLP

(57) ABSTRACT

A method implements hybrid type simulation serving to validate an inertial unit of a moving body on board an angular movement simulator by comparing a trajectory of the moving body as calculated in a real navigation environment with at least one reference trajectory.

21 Claims, 7 Drawing Sheets

METHOD AND A SYSTEM FOR VALIDATING AN INERTIAL UNIT OF A MOVING BODY

CROSS-REFERENCE TO RELATED APPLICATIONS

This application is the U.S. National Stage of PCT/FR2009/050185, filed Feb. 6, 2009, which in turn claims priority to French Application No. 0850793, filed Feb. 8, 2008. The content of both applications are incorporated herein by reference in their entirety.

BACKGROUND OF THE INVENTION

The present invention relates to the general field of navigation equipment, and more particularly to inertial units.

More particularly, the invention relates to validating an inertial unit of a moving body on board a movement simulator.

In known manner, an inertial unit is a piece of navigation equipment fitted to a moving body (e.g. an aircraft, a rocket) and including measurement instruments such as accelerometers or gyros (rate gyros or free gyros). An inertial unit makes use of measurements performed by such instruments to deliver inertial information to the computer on board the moving body, which inertial information relates, for example, to the angular speed and to the acceleration of the moving body.

On the basis of this inertial data, the computer on board the moving body estimates the three-dimensional position of the moving body and, as a function thereof, it delivers orders or commands to piloting members of the moving body (e.g. airfoil control surfaces, valves, etc.) in order to direct the moving body towards an intended destination and along a determined trajectory.

If the inertial unit presents a fault, the on-board computer estimates the three-dimensional position of the moving body on the basis of inertial information that is inexact. It therefore makes errors at each calculation step and sends erroneous commands to the piloting members. Consequently, the true trajectory of the moving body is very different from the trajectory as estimated by the on-board computer. Thus, if the inertial unit presents a severe defect, the commands sent by the on-board computer are completely inappropriate and the moving body runs the risk of being destabilized.

In order to monitor and validate the functioning of inertial units, use is often made of angular movement simulators that are implemented in hybrid simulations. Such hybrid simulations make use firstly of real subassemblies (e.g. an inertial unit, an angular movement simulator, the on-board computer of the moving body, certain other components of the moving body, etc.) and also of mathematical models of other subassemblies (e.g. concerning propulsion or elements of the environment, such as a mathematical model of the atmosphere, of the earth, etc.).

The angular movement simulators implemented in such hybrid simulations serve to reproduce the angular movements of the moving body in terms of angular range, speed, and acceleration, but they do not enable movements in translation to be reproduced. Consequently, the information from the accelerometers of the inertial unit as supplied to the on-board computer is incomplete since it does not include any information relating to linear movement of the moving body.

In order to mitigate that problem, there presently exist two hybrid simulation strategies that differ in terms of the accelerometer information that is taken into account.

The first strategy consists in replacing the information from the accelerometers of the inertial unit with accelerometer information coming from a mathematical model. In that first strategy, any anomalies that might be present in the accelerometer information delivered by the inertial unit cannot be detected by the hybrid simulation since there is no contribution from the accelerometers of the inertial unit.

The second strategy consists in taking the information from the accelerometers of the inertial unit and adding thereto information that is representative of movements in translation, as calculated using a mathematical model. However, in that second strategy, the information coming from the accelerometers of the inertial unit is measured at a fixed point corresponding to the coordinates of the simulation laboratory. That information is therefore not entirely representative of the information that the accelerometers would supply on the basis of the same physical origins while actually following the trajectory of the moving body around the terrestrial globe. For example, the gravity acting at the fixed point of the laboratory does not vary, whereas the gravity sensed by the accelerometers of an inertial unit on board a moving body that is moving around the terrestrial globe varies as a function of altitude and as a function of latitude. This difference thus falsifies the trajectory calculation of the moving body as obtained by using the inertial unit at the fixed point of the laboratory, and makes it difficult to interpret the results. As a result, that second strategy is capable of detecting only coarse defects in any of the accelerometers of the inertial unit.

Similarly, the information from the gyros of the inertial unit is likewise not necessarily representative of what it would have been were the moving body moving around the terrestrial globe. The rotation of the earth as resolved onto the gyro axes differs depending on whether the inertial unit is situated at a point having fixed coordinates (as applies to hybrid simulation in a laboratory) or whether it is on board a moving body that is moving around the terrestrial globe. The effect of this incomplete representativity is such as to complicate the analysis of the results obtained when performing hybrid simulation. Thus, a trajectory may be obtained for the moving body that is different from the expected trajectory, but without it being certain whether or not this difference is associated with the incomplete representativity of the gyro information. It is therefore not possible to assert in certain manner and without performing more complete analysis whether or not an inertial unit complies with acceptable tolerances relative to the nominal values specified by the manufacturer of the inertial unit.

OBJECT AND SUMMARY OF THE INVENTION

The present invention provides a method of validating an inertial unit of a moving body on board an angular movement simulator, the movement simulator being located at a point having fixed coordinates in the terrestrial frame of reference, and the validation being implemented by comparing a trajectory of the moving body as calculated in a real navigation environment with at least one reference trajectory.

According to the invention, in order to obtain the calculated trajectory, the method of the invention includes a stage of piloting the moving body, which stage comprises a plurality of iterations, and each iteration comprises:

a data-obtaining step of using a simulation tool modeling the inertial unit in the real navigation environment and fed with piloting commands calculated at the preceding iteration, to obtain:
a point of the calculated trajectory of the moving body;

simulation inertial data representative of the inertial data that ought to be supplied by the inertial unit in the real navigation environment; and movement commands representative of a movement to be executed by the movement simulator;

a step of the inertial unit supplying measurement inertial data representative of the movement after it has been executed by the movement simulator;

a theoretical modeling step of theoretically modeling the measurement inertial data supplied by the inertial unit from movement data concerning the movement really executed by the movement simulator for said movement, the theoretical modeling step supplying theoretical inertial data;

at least one compensation step of compensating at least one error that might falsify the theoretical modeling of the measurement inertial data by the theoretical inertial data, the at least one compensation step being implemented before the theoretical modeling step; and a step of calculating piloting commands from the simulation inertial data, the theoretical inertial data, and the measurement inertial data.

In corresponding manner, the invention also provides a validation system for validating an inertial unit of a moving body on board on an annular movement simulator, the movement simulator being located at a point having fixed coordinates in the terrestrial frame of reference, the system comprising comparator means for validating the inertial unit by comparing a trajectory of the moving body as calculated in a real navigation environment with at least one reference trajectory.

According to the invention, the system further comprises, in order to obtain the calculated trajectory, means operated during each iteration of a piloting stage comprising a plurality of iterations to implement:

a simulation tool modeling the inertial unit in the real navigation environment and fed with piloting commands calculated at the preceding iteration, the simulation tool including means for obtaining:

a point of the calculated trajectory of the moving body;

simulation inertial data representative of the inertial data that ought to be provided by the inertial unit in the real navigation environment; and movement commands representative of a movement to be executed by the movement simulator;

means for obtaining measurement inertial data supplied by the inertial unit and representative of the movement after it has been executed by the movement simulator;

theoretical modeling means for modeling the measurement inertial data supplied by the inertial unit from movement data concerning the movement really executed by the movement simulator for said movement, the theoretical modeling means supplying theoretical inertial data;

compensation means for compensating at least one error that might falsify the theoretical modeling of the measurement inertial data by the theoretical inertial data, the compensation means being implemented upstream from the theoretical modeling means; and calculation means for calculating piloting commands from the simulation inertial data, the theoretical inertial data, and the measurement inertial data.

In preferred but non-limiting manner, the inertial data taken into consideration in the invention comprises accelerometer information (e.g. acceleration), and gyro information (e.g. speeds of rotation). By way of example, this information is expressed in the form of three components corresponding to the axes X, Y, and Z of the frame of reference of the inertial unit.

As a result, it is possible to detect any defects that might arise in particular from the accelerometers of the inertial unit, from which the accelerometer measurement inertial data is taken.

Nevertheless, these assumptions are not in any way limiting. The invention applies equally well to inertial data comprising accelerometer information (e.g. acceleration) or gyro information, and also to other types of inertial data, i.e. corresponding to sensors other than gyros and accelerometers. Furthermore, the inertial data taken into consideration may be expressed in the form of some other number of components (for example it is possible that only one component is of interest).

Furthermore, the validation method and system of the invention enable a trajectory to be generated for the moving body that is very close to reality and does not suffer from the problem associated with the measurements being taken at the fixed point of a laboratory.

In accordance with the invention, account is taken while calculating the piloting commands and a fortiori while calculating the trajectory of the moving body, of the inertial information coming from the inertial unit for validation and also of additional information calculated by the theoretical modeling means and the simulation tool of the validation system. Thus, the gyro and accelerometer information used for calculating the piloting commands and the trajectory of the moving body is representative of the information that the inertial unit on-board the moving body would supply while following a trajectory around the terrestrial globe.

Furthermore, because errors that might falsify the theoretical modeling of the measurement inertial data are compensated by the theoretical inertial data, it is ensured that only problems associated with the inertial unit are detected while the inertial unit is being validated, and any problems associated with poor representativity of the measurement inertial data compared with the theoretical inertial data are set aside.

As a result, the analysis of the resulting trajectory relative to the reference trajectory(ies) is simplified: there is no need to call on an expert to analyze the results. It is thus possible, in simple and reliable manner, to verify whether the inertial unit for validating does indeed possesses characteristics in compliance with requirements. Improvements are thus obtained in terms of the quality of the analysis and the costs associated with running tests for validating the inertial unit.

Advantageously, each iteration is implemented in real time at a clock rate determined by the clock rate of the moving body. Correspondingly, this means that the simulation tool, the inertial unit, the theoretical modeling means, the compensation means, and the calculation means of the validation system of the invention operate in real time at a clock rate determined by the clock rate of the moving body.

In a particular embodiment of the invention, the piloting commands are calculated as a function of inertial data I defined by I=T2+R−T1, where T2, R, and T1 respectively designate the simulation inertial data, the measurement inertial data, and the theoretical inertial data.

Thus, it is possible to use an under-dimensioned movement simulator for transients having a large angular dynamic range in the trajectory. Because of the principle I=T2+R−T1, and since R and T1 depend on the movement actually performed by the movement simulator, they remain consistent with each other even if the movement simulator does not execute the commands correctly. This makes it possible to cause the moving body to follow an accurate trajectory at smaller cost.

According to an aspect of the invention, said at least one compensation step of compensating at least one error comprises a step of calibrating at least one of the movement commands in order to compensate for angular differences that exist between the axes of the movement simulator, and the corresponding axes of the terrestrial frame of reference.

Correspondingly, in this aspect, the compensation means for compensating at least one error of the validation system comprise means for calibrating at least one of the movement commands in order to compensate for the angular differences that exist between the axes of the movement simulator and the corresponding axes of the terrestrial frame of reference.

The positioning errors of the movement simulator relative to the terrestrial frame of reference (geographic north, vertical at the site) are thus compensated. This avoids creating differences in the calculated trajectory that are due to the movement simulator being positioned only approximately relative to the terrestrial references, i.e. to the measurement inertial data being poorly representative of the theoretical inertial data (i.e. there is a non-negligible difference between the measurement inertial data and the theoretical inertial data).

Furthermore, by also matching the axes of the inertial unit with the axes of the movement simulator, it becomes possible to position the inertial unit in three dimensions with position values (movement commands) that are expressed directly in the terrestrial frame of reference. This provides positioning as desired, and the movement data concerning movements really executed by the movement simulator can be used directly by the theoretical model for calculating the image of the measurement inertial data supplied by the inertial unit. This serves to avoid introducing angular positioning errors in the calculations of the terrestrial contributions implemented in the theoretical model.

Finally, controlling positioning errors of the movement simulator relative to the terrestrial frame of reference (angular differences between the frames of reference) makes it possible to ensure that testing is performed repetitively and accurately (in particular in terms of positioning of the inertial unit), thereby guaranteeing that results are reliable.

According to another aspect of the invention, said at least one compensation step of compensating at least one error comprises a step of applying a phase advance to at least some of the movement data concerning the movement really executed by the movement simulator before supplying it to the theoretical modeling step, in order to synchronize the theoretical inertial data with the measurement inertial data.

Correspondingly, and in this other aspect, the compensation means for compensating at least one error comprise means for applying a phase advance on at least some of the movement data concerning the movement really executed by the movement simulator before supplying it to the theoretical modeling means, in order to synchronize the theoretical inertial data with the measurement inertial data.

As a result, time offsets associated with the rates at which the various elements of the validation system of the invention are performed are compensated, thus making it possible to guarantee that the theoretical inertial data is synchronized in time with the measurement inertial data. This step is therefore particularly important when the iterations of the validation method of the invention are implemented in real time.

This also ensures that the measurement inertial data and the theoretical inertial data used for calculating piloting commands are uniform in time, and with this applying on each iteration of the validation method. This avoids generating calculation differences at each iteration, which differences are cumulative all along the calculation of the trajectory of the moving body, and end up by having a non-negligible consequence on the trajectory as calculated for the moving body by the validation method and system, where this can be particularly penalizing in terms of interpreting the calculated trajectory.

When, at the end of the validation method, the inertial unit is considered as being non-valid, the validation method may also comprise a diagnosis step implemented by comparing accumulated sums evaluated from the measurement inertial data obtained on each iteration for the trajectory of the moving body with accumulated sums evaluated from the theoretical inertial data obtained on each iteration for the trajectory of the moving body.

Correspondingly, the validation system may include diagnosis means for use when said inertial unit is considered as being non-valid by said validation system, which means are suitable for comparing accumulated sums evaluated from the measurement inertial data obtained on each iteration for the trajectory of the moving body with accumulated sums evaluated from the theoretical inertial data obtained on each iteration for the trajectory of the moving body.

Thus, by evaluating and comparing these accumulated sums for each component of the inertial information (i.e. relative to each axis of the inertial unit, both for gyro information and for accelerometer information), it is possible to diagnose which channel(s) of the tested inertial unit is/are faulty.

In a particular implementation of the invention, the validation method further includes, during each iteration, a step of applying a phase advance to the movement commands before supplying them to the movement simulator, in order to compensate for an execution delay inherent to the movement simulator.

Correspondingly, in this particular implementation of the invention, the validation system further includes means for applying a phase advance to the movement commands before they are supplied to said movement simulator, in order to compensate for an execution delay that is inherent to the movement simulator.

It is thus possible to compensate for the execution delays of the movement simulator, thereby enabling the measurement inertial data supplied by the inertial unit and the simulation inertial data supplied by the simulation tool to remain in phase. This makes its possible to guarantee the representativity not only of the implementation of the inertial unit, but also of any other sensors (homing device) simultaneously on-board the movement simulator.

Advantageously, the movement commands present a profile that is synchronous with the profile of the really-executed movement data, and the amplitudes of the really-executed movement data and of the movement commands are consistent.

Thus, the movement commands match the movements really executed by the movement simulator, thus making it possible to obtain a simulation of the inertial unit that is in phase with the movements of the moving body as delivered by the simulation tool. This is most important, in particular for any sensors mounted together with the inertial unit on the movement simulator and for which a non-synchronous profile would give rise to delays in the servo-control system, thereby giving rise to difficulties of interpretation of such test results associated with such other sensors.

In a particular implementation of the invention, the validation method further includes, on each iteration, a masking step after the data-obtaining step and before the step of applying a phase advance to the movement commands, such that the masking step is fed with the movement commands and supplies masked movement commands to the step of applying a phase advance to the movement commands in order to mask at least some of the stages of the movement.

Correspondingly, the validation system may further include, downstream from the simulation tool and upstream from the means for applying a phase advance to the movement commands, masking means fed with the movement commands and adapted to provide masked movement commands to the means for applying a phase advance to the movement commands in order to mask at least some of the stages of the movement.

It is thus possible to follow a trajectory in which the angular range of the moving body is greater than that authorized by the movement simulator.

According to a feature of the invention, at least some of the masked movement commands depend on a relationship that is internal to the masking step and independent of the movement commands.

This makes it possible to follow a trajectory in which the moving body performs a plurality of loops or circuits while using a movement simulator that presents an angular range that is limited.

In a particular implementation of the invention, the validation method further includes an initialization stage comprising a plurality of iterations, each iteration of said initialization stage comprising:
 a data-obtaining step using said simulation tool to obtain:
  a point of said calculated trajectory of said moving body;
  simulation inertial data representative of the inertial data that ought to be supplied by said inertial unit in said real navigation environment; and
  movement commands representative of a movement to be executed by said movement simulator; and
 the following steps of the validation method as described above: the step of supplying measurement inertial data; the theoretical modeling step; the compensation step; and the step of calculating said piloting stage.

This initial stage corresponds in particular to a stage during which the moving body is not piloted, in particular because certain conditions for piloting the moving body are not satisfied, such as sufficient speed, for example.

BRIEF DESCRIPTION OF THE DRAWINGS

Other characteristics and advantages of the present invention appear from the following description given with reference to the accompanying drawings that show embodiments having no limiting character. In the figures.

DETAILED DESCRIPTION OF SEVERAL EMBODIMENTS

In the various embodiments described below, the inertial data taken into consideration (i.e. the measurement inertial data R, the simulation inertial data T2, the theoretical inertial data T1, and the inertial data I) comprises accelerometer information and gyro information, expressed respectively in the form of three components corresponding to the axes X, Y, and Z of the inertial unit.

Nevertheless, these assumptions are not in any way limiting. The invention may naturally apply equally well to inertial data that includes accelerometer information only or that includes gyro information only, or indeed that includes other types of inertial data corresponding to sensors other than gyros and accelerometers.

Furthermore, in a variant embodiment, the inertial data may be expressed in the form of some other number of components (for example, only one component may be of interest).

As described above, the invention relates to a method and to a system for validating an inertial unit of a moving body mounted on board an angular movement simulator located at a point having fixed coordinates in the terrestrial frame of reference. The validation is performed by comparing a trajectory of the moving body as calculated in a real navigation environment with at least one predetermined reference trajectory.

The trajectory of the moving body is calculated using a hybrid simulation architecture that makes use both of real subassemblies (e.g. computer on board the moving body, inertial unit of the moving body, angular movement simulator), and also of numerical models of the moving body (e.g. propulsion, fuel consumption, inertial unit) and of its environment (e.g. atmosphere, terrestrial effects).

In the embodiments described herein, the trajectory is made up of a plurality of points, each point being defined by a triplet (longitudinal, latitude, altitude) evaluated in the terrestrial frame of reference.

The hybrid simulation implemented by the validation system in order to calculate the trajectory comprises at least one "piloting" stage during which the moving body is piloted by using piloting commands generated by its on-board computer. A preliminary or "initialization" stage prior to the piloting stage, and during which the moving body may move without being piloted (e.g. because the speed of the moving body is not sufficient after being launched), may also be considered at the beginning of simulation, as described below.

The piloting stage of the validation method of the invention comprises a plurality of iterations executed using the above-mentioned hybrid simulation architecture, implemented in real time in a closed loop. Each of these iterations enables a point to be obtained of the calculated trajectory of the moving body.

First Embodiment of the Invention

Figure 1:
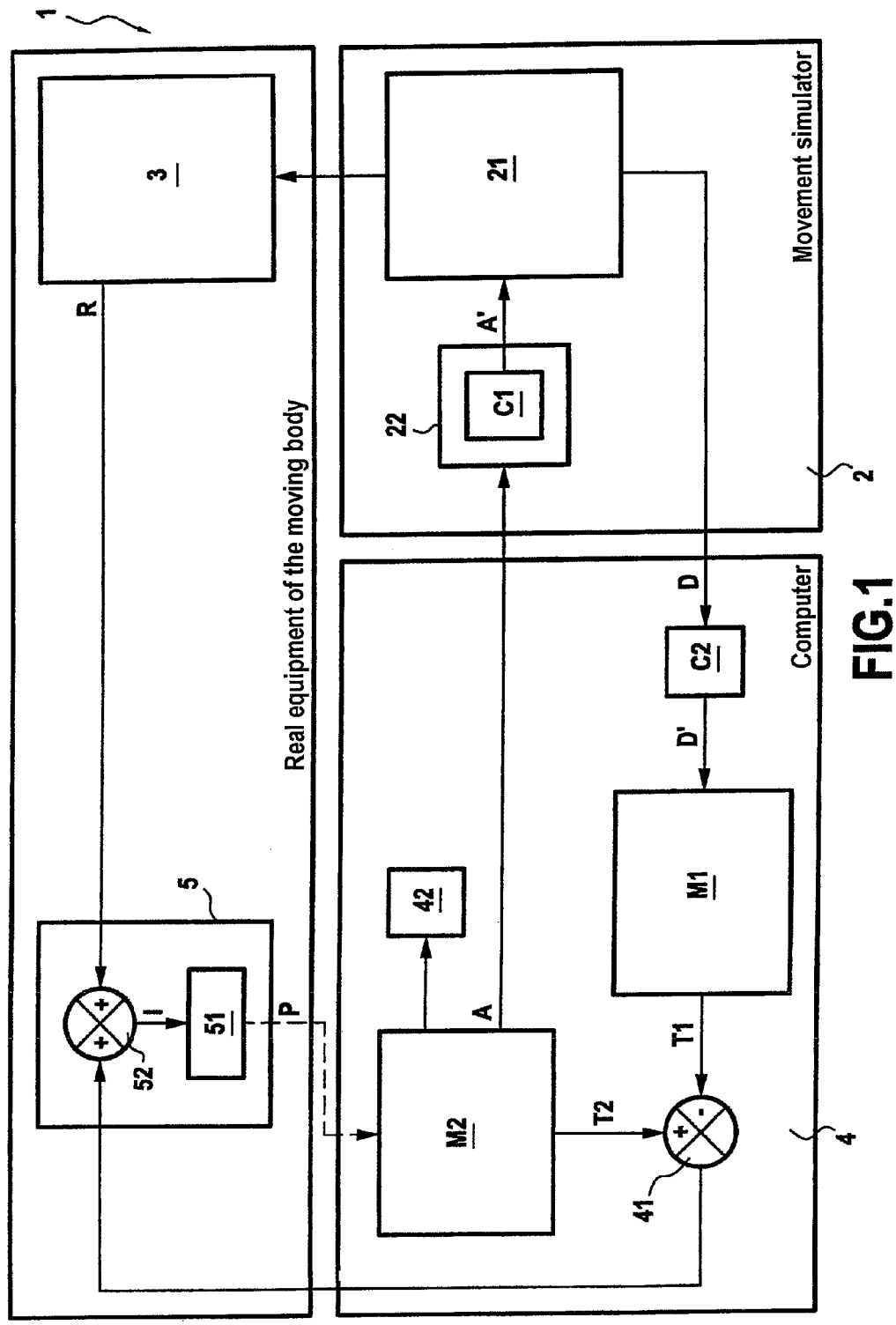
FIG. 1 is a diagram of a first embodiment of a validation system in accordance with the invention for validating an inertial unit of a moving body.

FIG. 1 is a diagram of a first particular embodiment of a validation system 1 in accordance with the invention and implementing said hybrid simulation architecture.

Figure 2:
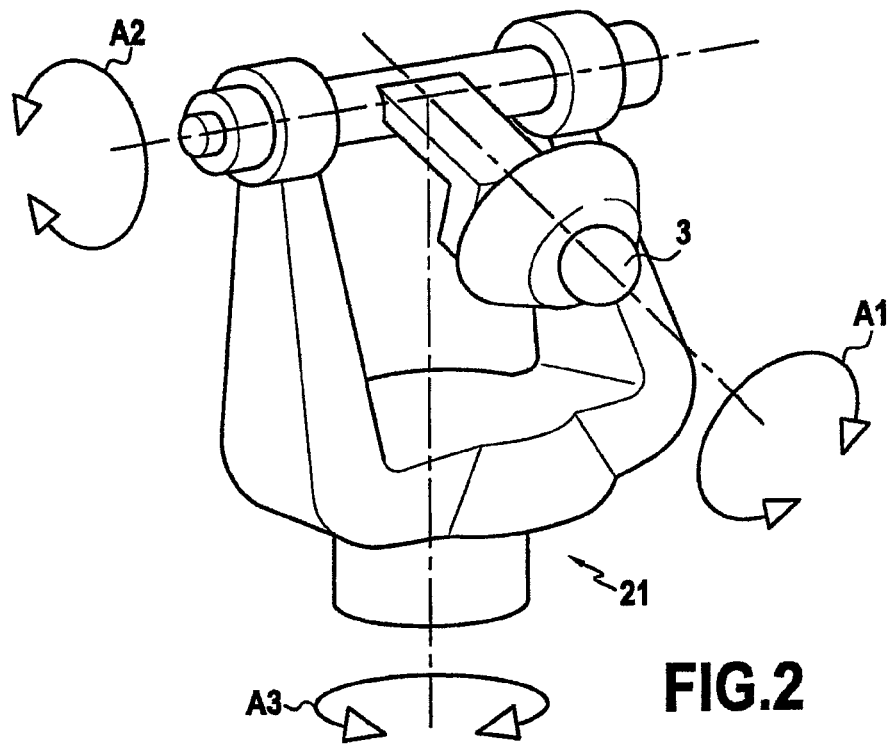
FIG. 2 is a diagram showing an example of a three-axis table of a movement simulator carrying an inertial unit.

The validation system 1 comprises an angular movement simulator 2 including a "three-axis" table 21 controlled using a digital control box 22 and adapted to receive a real inertial unit 3 of a moving body for validation. An example of a "three-axis" table suitable for receiving the inertial unit 3 is shown in FIG. 2. Such a table is known to the person skilled in the art and it is not described in greater detail herein.

In a variant, the angular movement simulator may include some other type of table, e.g. a table of the "five-axis" type.

The angular movement simulator 2 is capable of performing angular movements about a roll axis A1, a pitch axis A2, and a yaw axis A3, thereby subjecting the inertial unit 3 to angular movements about the axes A1, A2, and A3. More precisely, these angular movements are applied by the table 21 to the inertial unit 3 as a function of digital movement commands A' received from the control box 22. These movement commands A' comprise:

an angular position,
an angular speed, and
an angular acceleration, each being expressed in the form of three components corresponding respectively to the different axes of the movement simulator 2 (roll, pitch, and yaw).

In the example described herein, the digital control box 22 has a screen (not shown in the figure) on which it is possible to view the digital commands applied to the inertial unit 3 by the "three-axis" table 21 of the movement simulator 2.

The inertial unit 3 includes measurement tools such as gyros (rate gyros or free gyros) and accelerometers (not shown in the figure) enabling it to deliver measurement inertial data R (measurement gyro and accelerometer information) in response to the movement applied by the movement simulator 2 and corresponding to the movement command A'.

It should be observed that the inertial unit 3 may be mounted on its own on the movement simulator 2 or it may be included in the moving body (not shown in FIG. 1), or at least in part of the moving body.

The angular movement simulator 2 is also connected to at least one computer device or computer 4, used in particular for implementing the digital modeling elements of the hybrid simulation architecture, i.e. in this example a theoretical model M1 and a simulation tool (or simulator) M2.

The theoretical model M1 is adapted to provide a theoretical image T1 (theoretical inertial data in the meaning of the invention) of the inertial data measured by the inertial unit 3 mounted on the movement simulator (i.e. at the fixed coordinate point of the laboratory where the movement simulator 2 is located). In other words, the theoretical inertial data provided by the theoretical model M1 represents the inertial data that the inertial unit 3 ought to measure at the fixed coordinate point if it is perfect.

To calculate the theoretical image T1, the theoretical model M1 relies on mathematical models of physical phenomena acting on the inertial unit 3 (theoretical expressions modeling terrestrial effects such as rotation of the earth or local gravity) together with effects associated with the angular movement performed by the movement simulator 2. In particular, it makes use of movement data D' representing the angular positions, speeds, and accelerations applied to the inertial unit 3 by the movement simulator 2.

The simulation tool M2 models the inertial unit 3 in a real navigation environment, i.e. in a navigation environment around the terrestrial globe, taking account of local terrestrial effects on the inertial unit (e.g. local gravity, speed of rotation of the earth). In known manner, such a simulation tool relies on mathematical models of the elements constituting the moving body (such as in particular a theory-of-flight model and an inertial-unit model presenting nominal characteristics (middle of tolerance range) from the specifications of the inertial unit 3) and of its environment.

In the example described herein, during the piloting stage, the simulation tool M2 calculates the following data from the piloting commands P:

a point X of the trajectory of the moving body in the real navigation environment;
simulation inertial data T2 representative of the inertial data that the inertial unit 3 is supposed to deliver in such an environment for said trajectory point; and
movement commands A that are delivered to the movement simulator 2 and that represent the movement to be applied to the inertial unit 3 corresponding to said trajectory point.

The theoretical model M1 and the simulation tool M2 are in the form of software, e.g. stored in the read-only memory of the computer 4 or in a non-volatile memory of the computer 4.

The validation system 1 also includes an on-board computer 5 of the moving body, connected firstly to the inertial unit 3 and secondly to the computer 4. The on-board computer 5 is in charge in particular of piloting and guiding the moving body on the basis of inertial data I. It is provided with a "pilot" module 51 for generating turning orders (or piloting commands) for the piloting functions of the moving body and compatible with the characteristics of the moving body (e.g. orders to turn airfoil control surfaces, valve opening commands, etc.). The "pilot" module 51 is an automatic function that acts in real time on the basis of the inertial data I to judge when the previously-issued order is accomplished and, if necessary, to adapt the level of the forthcoming order to be issued as a function of a setpoint trajectory.

In general, an on-board computer of a moving body manages piloting commands from inertial data derived from gyros and accelerometers of the inertial unit of the moving body. In the validation system 1 of the invention, the numerical data I used by the on-board computer 5 for determining the piloting commands P depends on the measurement inertial data R, on the simulation inertial data T2, and on the theoretical inertial data T1, as explained in greater detail below.

It should be observed that the various connections between the computer 4, the movement simulator 2, the on-board computer 5, and the inertial unit 3 may be implemented via electrical or optical cables, by radio, or by other means.

Figure 3A:
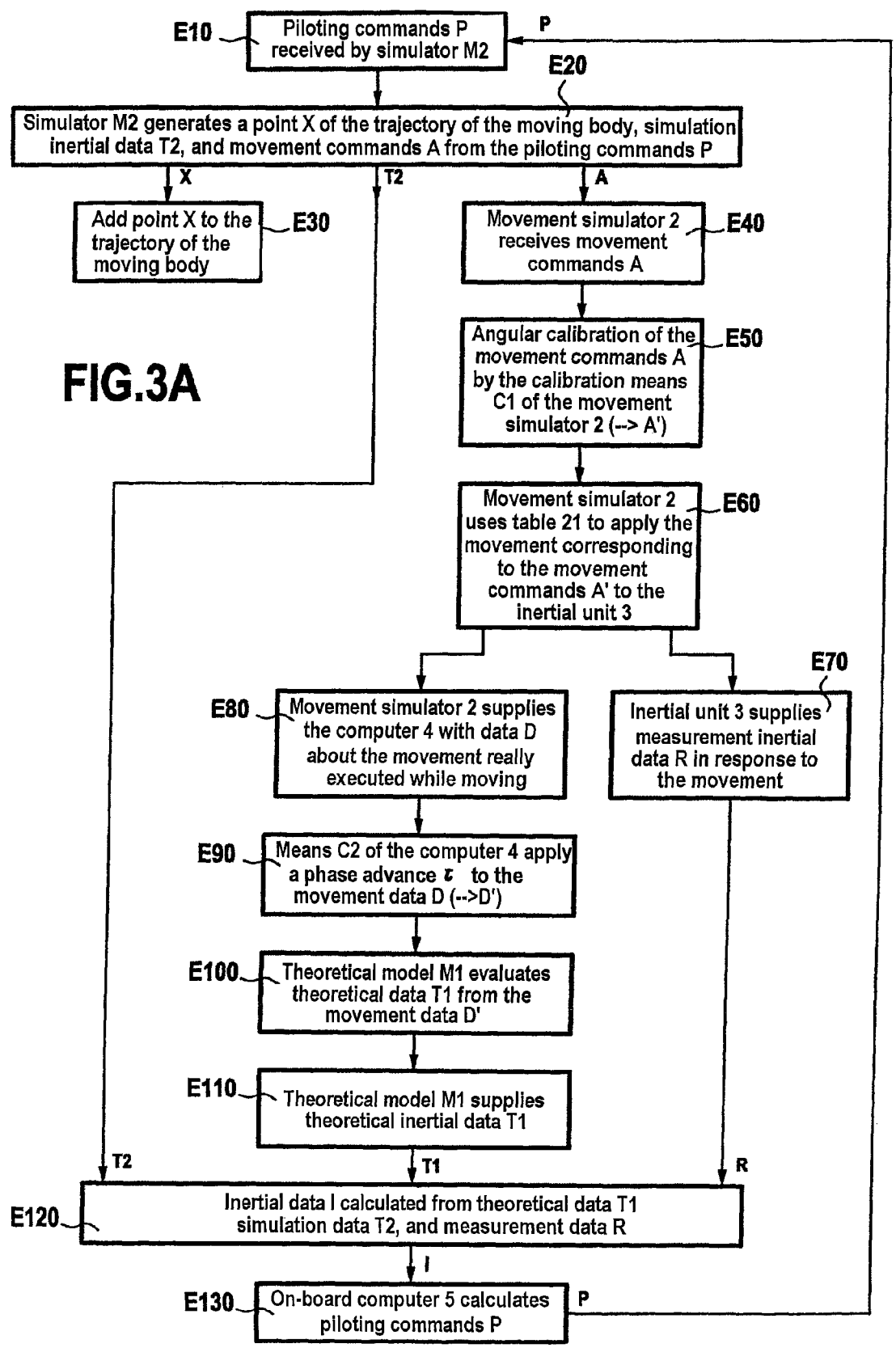
FIG. 3A is a flow chart showing the main steps implemented at each iteration of a piloting stage of the validation method of the invention for generating the trajectory of a moving body, with the steps that are implemented by the particular embodiment of the validation system shown in FIG. 1.

With reference to FIG. 3A, there follows a description of the main steps implemented on each iteration of the piloting stage of the validation method of the invention by the validation system 1 in order to evaluate a point of the trajectory of the moving body associated with the inertial unit 3.

Running an Iteration of the Piloting Stage

As described above, each iteration i of the piloting stage of the validation method of the invention is implemented in real time by different entities of the validation system 1, at a clock rate that is determined by the clock rate of the moving body. More precisely, on each iteration, the calculations and exchanges of data between the on-board computer 5 of the moving body, the simulator M2, the theoretical model M1, the angular movement simulator 2, and the inertial unit 3 are performed at the real frequency that clocks the operations performed by the moving body, and advantageously within a time period that is shorter than the period corresponding to said frequency.

During an iteration i, on receiving piloting commands P generated by the on-board computer 5 at iteration i−1, on the basis of inertial data I (step E10), the digital simulation tool M2 generates a point X of the trajectory of the moving body in the real navigation environment (step E20). For this purpose, the simulation tool M2 uses a theory-of-flight model that enables it to respond to the piloting commands P and in the real navigation environment in order to calculate the real position of the moving body, i.e. its longitude, its latitude, and its altitude (i.e. trajectory point). This trajectory point X then increments the trajectory of the moving body as generated by the validation method of the invention at each iteration of the piloting stage (step 30).

The simulator M2 also provides, in real time and during step E20:
- simulation inertial data T2 representative of the inertial data that ought to be measured by the inertial unit 3 for the new point X of the calculated trajectory in the real navigation environment, i.e. when the moving body is moving around the terrestrial globe; and
- digital movement commands A indicating the movement to be executed by the movement simulator 2 in response to the piloting commands P (movement that needs to be performed by the moving body in order to reach the new trajectory point X). These movement commands A are calculated in particular on the basis of the theory-of-flight model, and here they comprise the angular positions, angular speeds, and angular accelerations that are to be applied to the axes of the movement simulator 2. In a variant, the movement commands A supplied by the digital simulation tool M2 do not necessarily include all of these values. For example, they may comprise angular positions only or angular positions and angular speeds only. In this variant embodiment, the movement commands are subsequently added to by the digital control box 22 using techniques that are known to the person skilled in the art (e.g. differentiating angular speeds in order to obtain angular accelerations) so that, on application to the "three-axis" table 21, angular positions, speeds, and accelerations are all available for each axis of the movement simulator 2.

The movement commands A are then transmitted by the simulation tool M2 to the movement simulator 2.

On receipt of the movement commands A by the movement simulator 2 (step E40), at least some of the movement commands A are calibrated by the digital control box 22 (step E50). The purpose of this calibration is to compensate for the angular differences (or biases) αR, αT, and αL that exist between the axes of the movement simulator 2 (respectively the roll axis, the pitch axis, and the yaw axis) and the corresponding axes of the terrestrial frame of reference.

In order to perform this calibration, the digital control box 22 includes compensation means C1 adapted to introduce the values of the angular differences αR, αT, and αL in a portion of the movement commands A. More precisely, the values αR, αT, and αL are subtracted by the calibration means C1 from the corresponding components of angular position contained in the movement commands A. As a result, the angular positions executed on the various axes of the movement simulator 2 are representative of the angular differences that exist between the axes of the movement simulator 2 and the corresponding terrestrial references (i.e. geographic north and the yaw axis of the movement simulator, the vertical at the site and the pitch axis of the movement simulator, the vertical at the site and the roll axis of the movement simulator).

The angular differences αR, αT, and αL are preferably evaluated during a parameter-setting stage prior to the validation method of the invention, and as described below.

The movement commands A' obtained after angular calibration of movement commands A are thus expressed directly in the terrestrial frame of reference. These commands A' are delivered by the digital control box 22 to the three-axis table 21 of the movement simulator 2 so that it applies the corresponding movement (step E60) to the inertial unit 3.

In response to the movement applied by the movement simulator 2, the inertial unit 3 provides measurement inertial data R (step E70). As mentioned above, measurement inertial data R comes from the gyros and accelerometers of the inertial unit 3.

Furthermore, and simultaneously, the movement data D actually executed by the movement simulator 2 on the inertial unit 3 is transmitted by the movement simulator 2 to the computer 4 (step E80) for supplying to the theoretical model M1. This movement data D is measured by angle sensors in particular, located on the movement simulator 2.

Prior to being supplied to the theoretical model M1, the movement data D is processed by means C2 of the computer 4 in order to apply a phase advance τ thereto (step E90). This phase advance τ seeks to guarantee time uniformity between the theoretical inertial data T1 generated by the theoretical model M1 and the measurement inertial data R provided by the inertial unit 3, and to do this on each iteration of the validation method.

In the example described herein, this phase advance is applied using an appropriate algorithm by the means C2 on the various components of the angular position and of the angular speed that are contained in the movement data D, and this is done independently for each component. This algorithm makes use in particular of the values for the angular position and speed components that are contained in the movement data D at the current iteration i and for the N preceding iterations (e.g. interactions i−1 and i−2), and also mean increase coefficients for this angular positions or speeds between the iterations (e.g. between iterations i and i−2). Such an algorithm is known to the person skilled in the art and is not described in greater detail herein.

In a variant, in another embodiment, it is possible also to apply the phase advance τ to the acceleration.

The phase advance τ applied by the means C2 is advantageously determined during the preliminary parameter-setting stage of the method of the invention, as described below.

The movement data D' obtained at the output from the means C2 is then delivered to the theoretical model M1 that, on the basis of said movement data, evaluates the theoretical inertial data T1 (step E100).

As described above, in order to generate the theoretical inertial data T1, the theoretical model M1 has a mathematical model that models the physical phenomena acting on a perfect inertial unit located at a point of fixed coordinates corresponding to the laboratory.

In the example described herein, the mathematical model used by the theoretical model M1 relies on the following equations to evaluate the theoretical gyro inertial data $G_1$ and the theoretical accelerometer inertial data $A_1$ applied to the axes of theoretical sensors and contained within the theoretical inertial data T1:

$$G_1 = \Omega_T + \omega$$

and $$A_1 = \Gamma_R + 2 \times \Omega_T \wedge V_R - g$$

where:
$\Omega_T$ is the expression for the instantaneous speed of rotation of the earth in the frame of reference of the inertial unit;

ω is the expression for the speed of rotation executed by the movement simulator 2, derived from the movement data supplied by the movement simulator 2 in the frame of reference of the inertial unit;

$\Gamma_R$ designates the acceleration relative to the earth that is theoretically applied to the frame of reference of the inertial unit;

$V_R$ designates the speed relative to the earth that is theoretically applied to the frame of reference of the inertial unit; and g designates local gravity expressed in the frame of reference of the inertial unit; the quantities $G_1, A_1, \Omega_T, \omega, \Gamma_R, V_R$, and g all designating vectors.

The theoretical inertial data T1 is assumed to be representative of the inertial data measured by the inertial unit 3 on board the movement simulator 2, i.e. the inertial data measured at a point having the fixed coordinates of the laboratory. Because of the phase advance τ applied by the means C2, the theoretical inertial data T1 supplied by the theoretical model T1 (step E110) and the measurement inertial data R supplied by the inertial unit (step E70) are synchronous.

The angle compensation means C1 and the phase advance application means C2 thus represent, in the meaning of the invention, means for compensating errors that might falsify the theoretical modeling of the measurement inertial data R by the theoretical inertial data T1. These compensation means are advantageously implemented upstream of the theoretical model M1 so as to guarantee good representativity for the measurement inertial data R by the theoretical inertial data T1.

The measurement inertial data R (supplied by the inertial unit 3), the theoretical inertial data T1 (supplied by the theoretical model M1), and the simulation inertial data T2 (supplied by the simulator M2) generated at iteration i is subsequently used to evaluate the inertial data I (step E120) defined as follows:

$$I = R + T2 - T1$$

To do this, use is made of arithmetic operator means 41 and 52, known to the person skilled in the art, that are located respectively in the presently-described example in the computer 4 and in the on-board computer 5, as shown in FIG. 1. Thus, the arithmetic operator means 41 initially evaluate the difference T2−T1, and then the arithmetic operator means 52 subsequently add the result of this difference to the inertial data R.

In a variant, the means 41 and 52 may be located in the computer 4, or in the on-board computer 5, or in some other device that is not shown in FIG. 1 (e.g. another computer). Furthermore, other operations may be performed, providing that that leads to I being calculated as defined above.

By calculating the theoretical expression T1 for the measurements that the inertial unit 3 ought to be measured at the fixed point, by subtracting T1 from R, and by adding the contribution of the simulation inertial data T2 (representative of measurements performed by the inertial unit on board the moving body when moving around the terrestrial globe), a trajectory is obtained that is representative of reality. It should be observed that by subtracting T1 from R, the contribution provided by the inertial unit 3 is removed to within η (η=|R−T1|), where the value of η increases with greater imperfection of the inertial unit 3.

The piloting commands P are then calculated as a function of the inertial data I by the on-board computer 5 (step E130), from the setpoint trajectory as described above.

These piloting commands P are then supplied to the simulator M2 during iteration i+1, and then steps E10 to E130 are repeated on each iteration of the piloting stage, so as to generate the trajectory of the moving body.

Iterations are stopped when the setpoint trajectory has been followed in full. This produces a calculated trajectory for the moving body as generated by the validation system 1 (in particular on the basis of trajectory points X generated by the simulation tool M2 at each iteration of the piloting stage).

This trajectory of the moving body as obtained in this way is then compared by the validation means 42 of the computer 4 with at least one predetermined reference trajectory in order to validate the inertial unit 3. This validation stage may be performed in deferred time, at the end of the iterations, or subsequently.

In a variant, validation may be performed by validation means contained in a device other than the computer 4, e.g. another computer.

Validation Stage

Figure 4:
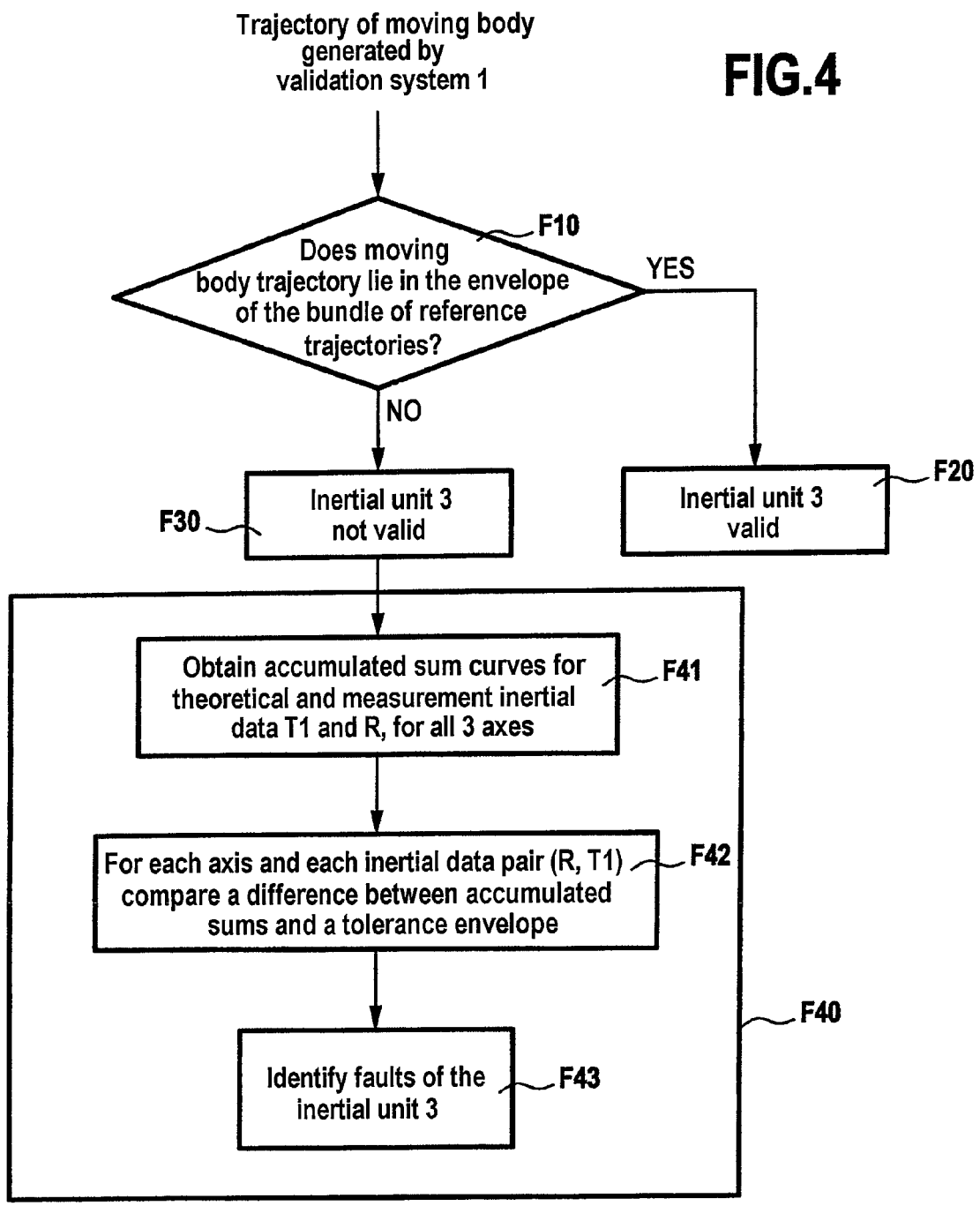
FIG. 4 is a flow chart showing the main steps implemented by the validation method of the invention in order to validate or not an inertial unit on the basis of the moving body trajectory obtained by the particular embodiment of the validation system shown in FIG. 1.

With reference to FIG. 4, there follows a description of the stage of validating the inertial unit 3 as implemented by the computer validation means 42 of the computer 4.

In the presently-described example, the trajectory of the moving body calculated by the validation system 1 is compared with a bundle of reference trajectories. More precisely, during validation step F10, it is determined whether the trajectory generated by the validation system 1 is contained within the envelope of the bundle of reference trajectories.

The bundle of reference trajectories is preferably evaluated during the preliminary parameter-setting stage prior to the validation method of the invention, as described below.

In a variant, it is possible to compare the trajectory generated by the validation system 1 with a single reference trajectory, rather than with a bundle of reference trajectories.

Furthermore, during the validation step F10, the comparison between the calculated trajectory of the moving body and the reference trajectory(ies) may be performed on one or more trajectory portions, e.g. as a function of the defects of the inertial unit that it is desired to detect.

If during validation step F10, it is determined that the trajectory of the moving body as generated by the validation system 1 lies within the envelope of the bundle of reference trajectories, then the inertial unit 3 is considered as being valid (step F20). This means that the inertial unit 3 has performance that lies within acceptable limits compared with the performance of a perfect inertial unit, and it satisfies the needs for which it has been provided. Under such circumstances, it may be that the inertial unit 3 possesses characteristics that are not nominal, but that these characteristics remain within limits or tolerances that are specified in its specifications.

Otherwise, the unit is considered as being not valid (step F30), i.e. that it presents major defects. The moving body does not reach the target set by the setpoint trajectory even though the on-board computer 5 believes it has reached that target (trajectory estimated by the on-board computer relative to the setpoint trajectory).

Under such circumstances, the validation means 42 may advantageously implement a diagnosis step (step F40) in order to identify the faulty channel(s) of the inertial unit 3, i.e. to identify firstly whether the inertial unit 3 has a defect in terms of its accelerometer and/or gyro measurement, and secondly to identify which axis or axes (X and/or Y and/or Z) is/are concerned by the defect(s).

In order to make this diagnosis step possible, the values of the theoretical inertial data T1 and of the measurement inertial data R are stored in memory on each iteration i implemented to generate the trajectory of the moving body.

On the basis of these stored values for R and T1, on each iteration i of the piloting stage and for each of the components of the inertial data (i.e. gyro and accelerometer data on the various axes), these values are accumulated from iteration 1 to iteration i (step F41). Thus, assuming that the gyro and accelerometer data are represented relative to three axes, twelve different sums are accumulated for each iteration, i.e.:

six sums for the measurement inertial data R; and
six sums for the theoretical inertial data T1.

Thus, for each gyro and accelerometer item of inertial data and for each axis, a curve is obtained of the sums over all of the iterations (step F41).

In step F42, by comparing the differences for each item of inertial data and for each axis, between the cumulative curves obtained for T1 and R and a "tolerance" envelope, it becomes possible to identify which item(s) of inertial data is/are faulty or which measurement channels are faulty in the inertial unit 3.

If for a particular axis and a particular item of inertial data a difference is obtained between the accumulated curve applying to T1 and to R for said particular axis and item of inertial data that lies outside the tolerance envelope, it is then considered that this particular axis for this particular item of inertial data of the inertial unit 3 is faulty (step F43).

A different tolerance envelope may be considered for each axis and/or for each item of inertial data.

As for the validation step, diagnosis may be implemented on or part of the measurement inertial data and of the theoretical inertial data, i.e. the sums evaluated may relate solely to certain components or to a limited window of iterations.

Parameter-Setting Stage

As described above, during the parameter-setting stage, several of the parameters used during the validation method are evaluated, including in particular:

the angular biases $\alpha R$, $\alpha T$, and $\alpha L$ applied by the compensation means C1 during step E50 to compensate for the angular differences that exist between the axes of the movement simulator 2 and the corresponding axes of the terrestrial frame of reference;

the phase advance $\tau$ applied by the means C2 of the computer 4; and the bundle of reference trajectories used during the stage of validating the inertial unit 3.

This parameter-setting stage takes place upstream from the validation method of the invention.

In order to evaluate the angular biases $\alpha R$, $\alpha T$, and $\alpha L$, the following successive operations are implemented during the parameter-setting stage:

1) Initially, a mechanical reference Ref1 is established on the three-axis table 21. Using this mechanical reference Ref1, tooling O1 dedicated to identifying the angular differences $\alpha R$, $\alpha T$, and $\alpha L$ is positioned in a manner that is accurate, known, and repeatable on the three-axis table 21. This tooling O1 has two levels of accuracy that are harmonized relative to the reference Ref1 by the design of the tooling O1. These two levels serve firstly to identify the angular difference $\alpha R$ (roll bias) and secondly to identify the angular difference $\alpha T$ (pitch bias). The tooling O1 also possesses another reference Ref2 that is used for sighting in order to identify the angular difference $\alpha L$ (yaw bias).

2) Starting from the canonic position of the three-axis table 21 (i.e. the position that the three-axis table 21 naturally takes up when it is operated without any particular digital command), the digital control box 22 and successive approximations are used to compensate the angular biases detected by the two levels of accuracy so as to obtain simultaneously for both levels of accuracy a measurement that is as close as possible to the horizontal. Thus, by reading directly from the screen of the digital control box 22 of the three-axis table 21, values are obtained for the roll bias $\alpha R$ and for the pitching bias $\alpha T$.

3) In order to identify the value of the yaw bias $\alpha L$, it is possible to use a north finder coupled with a theodolite. Once geographical north has been found using the north finder, a sighting is taken with the theodolite on reference Ref2 of the tooling O1. Thereafter, by successive approximations, the sighting of the theodolite is aligned on the reference Ref2, using firstly the digital control box 22 and secondly the theodolite. When alignment appears to have been achieved (or at least for the best alignment reached in this way), a value is obtained for the yaw bias $\alpha L$ by summing the bias produced in the digital commands of the table 21 on the yaw axis (of values that can be read from the screen of the digital control box 22) plus the bias produced for changing the sighting of the theodolite from the position that characterizes geographic north to the position that corresponds to the best alignment of the sighting on the reference Ref2.

In addition, during iterations, second tooling O2 is also used that is indexed using the index Ref1, so as to position the inertial unit 3 for validating in known, accurate, and repeatable manner relative to the axes of the movement simulator 2.

Because of these various operations, and by applying the angular differences $\alpha R$, $\alpha T$, and $\alpha L$ on the digital commands A during step E50, it is ensured that the axes of the movement simulator 2 are well harmonized with the axes of the terrestrial frame of reference (on-site vertical, geographic north) and that the positions of the reference axes of the inertial unit 3 are known accurately. The reference Ref1, the design of the tooling O2, and the intrinsic positioning performance of the movement simulator guarantee that three-dimensional positioning is repeatable.

In order to estimate the phase advance $\tau$ for application by the compensation means C2, consideration is given to the execution times needed to obtain firstly the measurement inertial data R and secondly the theoretical inertial data M1. Thus, by way of example, using the following assumptions:

the data inputs/outputs in each entity of the validation system 1 are performed once per clock period (written Te);

the step E80 of the movement simulator supplying movement data D and the step E70 of the inertial unit 3 supplying measurement inertial data R are synchronos;

$\theta e$ designates the delay with which measurement inertial data R is sent to the on-board computer 5 of the moving body (i.e. the delay corresponding to the time that elapses between the inertial unit 3 making the measurements and the measurements being sent to the on-board computer 5 of the moving body);

$\theta p$ designates the delay in taking the movement data D as actually performed by the movement simulator 2 (i.e. the delay corresponding to the time that elapses between the movement data D being taken and then being made available to the theoretical model M1); and a clock period Te is necessary for making available to the on-board computer 5 the theoretical inertial data T1 calculated by the theoretical model M1, phase advance included (cf. steps E90 to E110);

then the phase advance $\tau$ to be applied by the means C2 is defined as follows:

$$\tau = Te + \theta e - \theta p$$

In order to determine the bundle of reference trajectories used during the stage of validating the inertial unit 3, use is made in conventional manner of a fully digital simulator that enables a moving body to be caused to follow its trajectory in a real navigation environment while taking account of the various tolerances of the inertial unit 3 (these various tolerances are conventionally specified by the manufacturer of the inertial unit for various characteristics of the inertial unit such as, for example, the biases, scale factors, unbalances).

For this purpose, the digital simulator includes a model of all of the real pieces of equipment of a moving body (in particular the on-board computer, the inertial unit, etc.), and also of its environment. For simplification purposes, this may comprise in particular the simulator M2 used during the validation method of the invention, with the on-board computer being also modeled therein.

In order to determine the bundle of trajectories, several trajectories are run using the digital simulator while modulating the various characteristics of the inertial unit within their respective tolerances, except for processing the accelerometer contribution associated with linear movements, for which the characteristics of the inertial unit are maintained at nominal values, so as to be consistent in the implementation that is applied in hybrid simulation. The set of trajectories that is obtained in this way constitutes the bundle of reference trajectories.

Initialization Stage

As described above, the hybrid simulation implemented by the validation system 1 may also include as a preliminary to the piloting stage, a so-called "initialization" stage, during which the moving body is not piloted by the on-board computer 5. In other words, the on-board computer 5 generates piloting commands P, but they are not taken into account for piloting the moving body.

This initialization stage may start in particular as soon as the elements of the validation system 1 have been switched on (i.e. on starting hybrid simulation) and may last so long as the necessary conditions have not been established to enable the moving body to enter into the piloting stage. Such conditions may be predetermined, and for example may consist in ensuring that the speed of the moving body is above a certain threshold, etc.

Figure 3B:
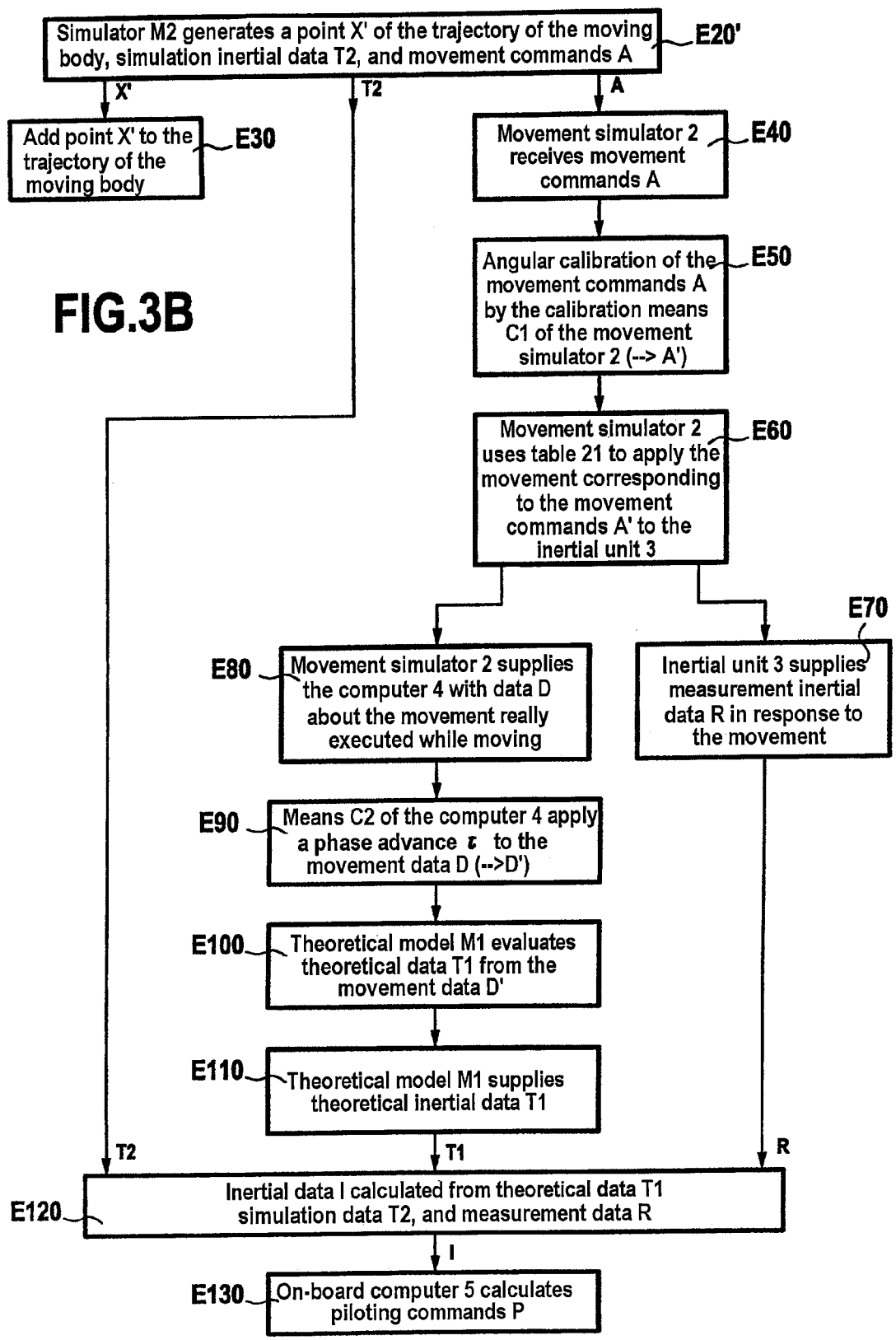
FIG. 3B is a flow chart showing the main steps performed during the various iterations implemented during an initialization stage that may precede the piloting stage in a particular embodiment.

In a manner similar to the piloting stage, the initialization stage comprises a plurality of iterations that are executed by the elements of the validation system 1, in real time and in an open loop, with each of these iterations taking place as shown in FIG. 3B.

The iterations implemented during the initialization stage differ from the iterations implemented during the piloting stage by the fact that the piloting commands P generated by the on-board computer 5 are not sent to the simulation tool M2 (that is why the arrow representing piloting commands being set to the simulation tool M2 is drawn in dashed lines in FIG. 1).

As a result, during the step E20', in the initialization stage, the simulation tool M2 generates a point X' of the trajectory of the moving body, the simulation inertial data T2, and the movement commands A, without making use of the piloting commands generated by the on-board computer 5 of the moving body, but as a function of any simulated movements of the moving body on its launch pad or during unpiloted movement thereof.

The steps E30 to E130 that are implemented during the initialization stage are similar to the steps E30 to E130 described above with reference to FIG. 3A for the piloting stage.

In particular, during the step E130, the on-board computer 5 of the moving body takes account of the inertial data I=T2+R−T1 to evaluate its location and to prepare for guiding and piloting the moving body.

The parameters used during the initialization stage (i.e. the angular biases αR, αT, and αL, and the phase advance τ) are the same as those used during the piloting stage and as evaluated during the parameter-setting stage.

When an initialization stage is implemented, as the trajectory calculated for the moving body, consideration is given to the trajectory formed firstly by the points X' evaluated during the initialization stage and secondly to the points X evaluated during the piloting stage. The reference trajectories taken into consideration during the validation stage then naturally also reflect both of these stages. Validation of the inertial unit and diagnosis thereof can then relate to all or part of the trajectory (e.g. on a portion of the trajectory corresponding to the piloting stage only, or on the "complete" trajectory as formed during both stages, etc.).

Second Embodiment of the Invention

Figure 5:
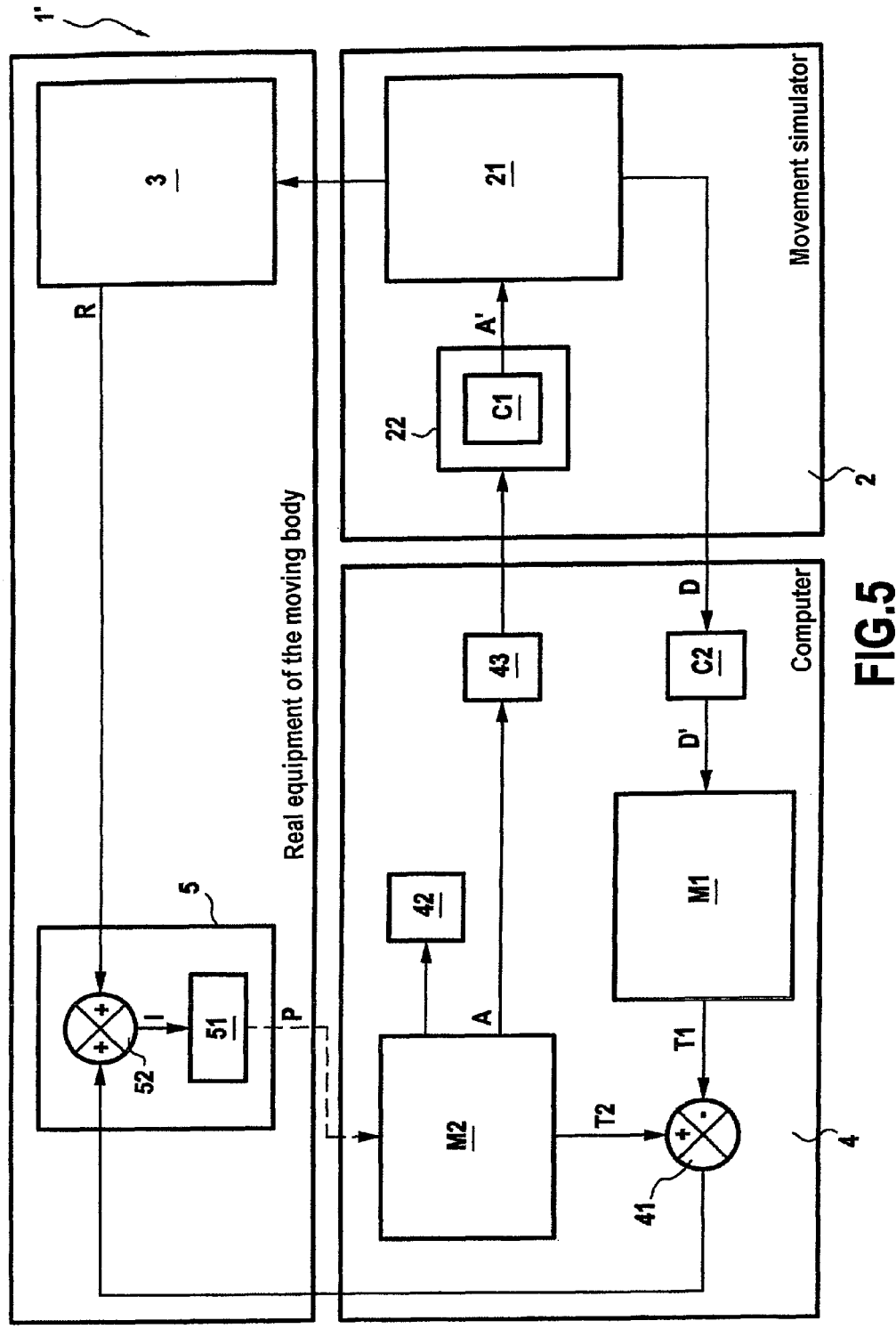
FIG. 5 is a diagram of a second embodiment of a validation system of the invention for validating an inertial unit of a moving body.

There follows a description with reference to FIG. 5 of a second embodiment of the invention, in which the validation system (reference 1') further includes means 43 for applying a phase advance φ to the movement commands A generated by the simulator M2 prior to being supplied to the movement simulator 2. These means 43 are included in the computer 4 in this example.

The other elements of the validation system 1', and the ways in which they operate, are similar to those included in the above-described validation system 1 for the first embodiment and they are given the same references (cf. FIGS. 1, 2, 3A, 3B, and 4).

The phase advance φ is applied by the means 43 on each iteration to the movement commands A using a suitable known algorithm that is not described in detail herein (e.g. using an algorithm similar to the algorithm used by the above-described compensation means C2). This algorithm takes care not to introduce distortions into the amplitudes of the movement commands, i.e. so as to guarantee that the amplitudes of the movement commands A and of the movement data D are consistent.

This phase advance φ tends to compensate an execution delay that is inherent to the movement simulator 2. It may advantageously be selected so that the movement commands A delivered by the simulation tool M2 present a profile that that is synchronous with the profile of the movement data D.

Thus, the simulation of the inertial unit 3 is caused to be synchronous with the angular movements of the moving body, thereby guaranteeing representativity for the implementation of the inertial unit 3 and any other sensors simultaneously on board the movement simulator 2.

Third Embodiment of the Invention

Figure 6:
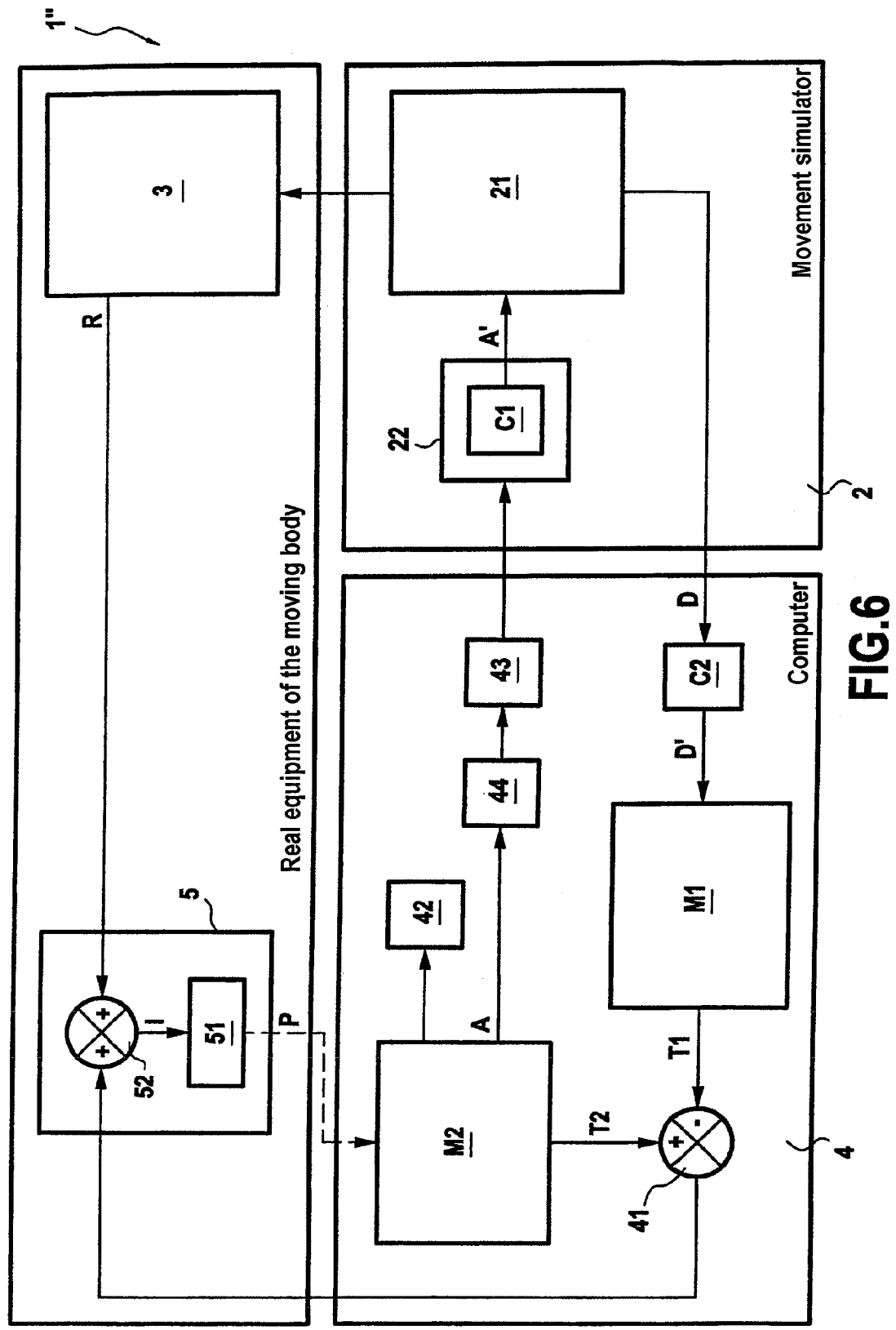
FIG. 6 is a diagram of a third embodiment of a validation system of the invention for validating an inertial unit of a moving body.

With reference to FIG. 6, there follows a description of a third embodiment of the invention in which the validation system (referenced 1") further includes masking means 44, which in this embodiment are implemented downstream from the simulation tool M2 and upstream from the means 43 for applying a phase advance.

The other elements of the validation system 1" and the ways in which they operate are similar to those included in the above-described validation systems 1 and 1' for the first and second embodiments, and they are given the same references (cf. FIGS. 1, 2, 3A, 3B, 4, and 5).

Thus, the masking means 44 are fed in real time from the simulation tool M2 with the movement commands A, and they supply masked movement commands to the means 43 for masking at least some of the movement stages of the moving body.

The means 43 for applying a phase advance then supply the movement simulator 2 with movement commands that take account of the masked movement commands in order to follow a trajectory for which the range of angular movement of the moving body is greater than that authorized by the movement simulator 2.

Thus, an angular movement of the movement simulator 2 or a stopping of this movement, piloted deliberately from the masking means 44, is taken into account by the measurement inertial unit R and the theoretical inertial data T1 but does not affect the piloting commands P. Given the formula I=T2−T1+R, the inertial data I is not affected by any angular movement or stopping of the movement simulator 2 as piloted by the masking means 44.

Furthermore, monitoring implemented by the masking means 44 makes it possible to limit the angular movement command before reaching hardware or software abutments of the movement simulator 2.

It should be observed that the theoretical model M1, the simulator M2, the means 43 for applying a phase advance, and the masking means 44 may all be included in the computer 4 of FIG. 6.

Figure 7:
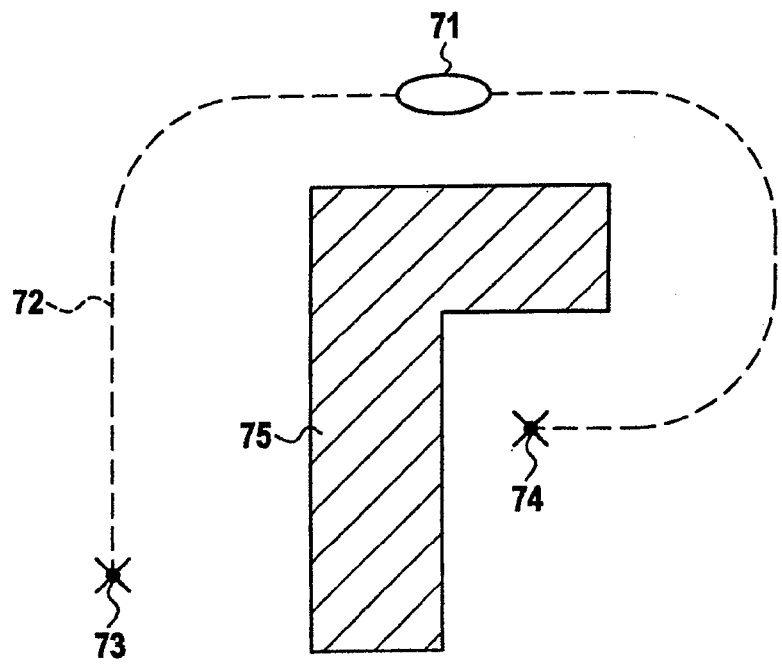
FIG. 7 is a diagram showing an example of a trajectory of a moving body.

In order to illustrate an application of the validation system 1", consideration is given, with reference to FIG. 7, to the moving body following a trajectory around an obstacle.

While using an under-dimensioned movement simulator 2 having a capacity for angular movement about the yaw axis of ±100 degrees (which corresponds to an angular excursion of 200 degrees), it is possible to follow a trajectory that presents an angular excursion of 270 degrees. Thus, in this example, the moving body 71 may follow a trajectory 72 from a starting point 73 to an arrival point 74 while going round an obstacle 75 with an angular excursion of 270 degrees.

While the trajectory 72 is being followed, it is possible to modify the angular positioning of one of the axes of the movement simulator 2. For example, the yaw axis A3 of the movement simulator 2 may be piloted independently of the yaw axis of the moving body 71.

Advantageously, at least some of the masked movement commands may depend on a relationship that is internal to the masking means 44. In particular, the internal relationships is independent of the movement commands A. Thus, it is possible to inject into the movement simulator 2 a movement command from the masking means 44 that is independent of the movement commands A coming from the simulation tool M2. This makes it possible to follow a trajectory in which the moving body 71 can perform a plurality of loops while using a movement simulator 2 that presents a limited angular range.

Furthermore, the trajectory may present a dynamic range that is greater than that authorized by the movement simulator 2.

By way of example, when for a transient event the movement commands A include a speed command that is greater than that which can be generated by the movement simulator 2, the characteristics of the movement data D concerning movements really executed by the movement simulator 2 are less than that represented by the movement commands A. Thus, this altered movement is taken into account by the measurement inertial data R and the theoretical inertial data T1. Nevertheless, e.g. because of the formula I=T2−T1+R, the inertial data I remains unaffected by the alteration of the movement. Thus, the trajectory is not followed because the movement simulator 2 is under-dimensioned.

The invention also provides a computer program downloadable from a communications network, the program including program code instructions for executing the steps of the validation system of the invention when executed on the computer 4. The computer program may be stored in a computer-readable medium and may be executable by a microprocessor.

The program may use any programming language, and be in the form of source code, object code, or code intermediate between source code and object code, such as in a partially complied form, or in any other desirable form.

The invention also provides a computer-readable data medium including instructions of a computer program as mentioned above.

The data medium may be any device suitable for storing a program. For example, the medium may comprise storage means such as read-only memory (ROM), e.g. a compact disk (CD) ROM, or a microelectronic circuit ROM, or indeed magnetic recording means, e.g. a floppy disk or a hard disk.

The invention claimed is:

1. A method of validating an inertial unit of a moving body on board an angular movement simulator, said movement simulator being located at a point having fixed coordinates in the terrestrial frame of reference, and said validation being implemented by comparing a trajectory of said moving body as calculated in a real navigation environment with at least one reference trajectory, said method including, in order to obtain said calculated trajectory, a stage of piloting said moving body, said stage comprising a plurality of iterations, and each iteration comprising:
a data-obtaining step of using a simulation tool modeling said inertial unit in said real navigation environment and fed with piloting commands calculated at the preceding iteration, to obtain:
a point of said calculated trajectory of said moving body;
simulation inertial data representative of the inertial data that ought to be supplied by said inertial unit in said real navigation environment; and
movement commands representative of a movement to be executed by said movement simulator;
a step of said inertial unit supplying measurement inertial data representative of said movement after it has been executed by said movement simulator;
a theoretical modeling step of theoretically modeling said measurement inertial data supplied by said inertial unit from movement data concerning the movement really executed by said movement simulator for said movement, said theoretical modeling step supplying theoretical inertial data;
at least one compensation step of at least one error that might falsify said theoretical modeling of said measurement inertial data by the theoretical inertial data, said at least one compensation step being implemented before said theoretical modeling step; and
a step of calculating piloting commands from said simulation inertial data, said theoretical inertial data, and said measurement inertial data.

2. The validation method according to claim 1, wherein each iteration is implemented in real time at a clock rate determined by the clock rate of said moving body.

3. The method according to claim 1, wherein said at least one compensation step of compensating at least one error comprises a step of calibrating at least one of said movement commands in order to compensate for angular differences that exist between the axes of said movement simulator, and the corresponding axes of said terrestrial frame of reference.

4. The method according to claim 1, wherein said at least one compensation step of compensating at least one error comprises a step of applying a phase advance to at least some of said movement data concerning the movement really executed by said movement simulator before supplying it to said theoretical modeling step, in order to synchronize said theoretical inertial data with said measurement inertial data.

5. The method according to claim 1, wherein said piloting commands are calculated as a function of inertial data I defined by I=T2+R−T1, where T2, R, and T1 respectively designate said simulation inertial data, said measurement inertial data, and said theoretical inertial data.

6. The method according to claim 5, wherein when said inertial unit is considered as being non-valid at the end of said validation, said method further comprises a diagnosis step implemented by comparing accumulated sums evaluated from said measurement inertial data obtained on each iteration for said trajectory of said moving body with accumulated sums evaluated from said theoretical inertial data obtained on each iteration for said trajectory of said moving body.

7. The method according to claim 1, further including, during each iteration, a step of applying a phase advance to said movement commands before supplying them to said movement simulator, in order to compensate for an execution delay inherent to said movement simulator.

8. The method according to claim 7, wherein said movement commands present a profile that is synchronous with the profile of said really-executed movement data, and the amplitudes of said really-executed movement data and of said movement commands are consistent.

9. The method according to claim 8, further including, on each iteration, a masking step after said data-obtaining step and before said step of applying a phase advance to said movement commands, such that said masking step is fed with said movement commands and supplies masked movement commands to said step of applying a phase advance to said movement commands in order to mask at least some of the stages of said movement.

10. The method according to claim 9, wherein at least some of said masked movement commands depend on a relationship that is internal to the masking step and independent of said movement commands.

11. The method according to claim 1, further including an initialization stage comprising a plurality of iterations, each iteration of said initialization stage comprising:
 a data-obtaining step using said simulation tool to obtain:
  a point of said calculated trajectory of said moving body;
  simulation inertial data representative of the inertial data that ought to be supplied by said inertial unit in said real navigation environment; and
  movement commands representative of a movement to be executed by said movement simulator; and
 the following steps of the validation method according to claim 1: the step of supplying measurement inertial data; the theoretical modeling step; the compensation step; and the step of calculating said piloting stage.

12. A validation system for validating an inertial unit of a moving body on board on an annular movement simulator, said movement simulator being located at a point having fixed coordinates in the terrestrial frame of reference, said system comprising comparator means for validating said inertial unit by comparing a trajectory of said moving body as calculated in a real navigation environment with at least one reference trajectory, said system further comprising, in order to obtain said calculated trajectory, means operated during each iteration of a piloting stage comprising a plurality of iterations to implement:
 a simulation tool modeling said inertial unit in said real navigation environment and fed with piloting commands calculated at the preceding iteration, said simulation tool including means for obtaining:
  a point of said calculated trajectory of said moving body;
  simulation inertial data representative of the inertial data that ought to be provided by said inertial unit in said real navigation environment; and
  movement commands representative of a movement to be executed by said movement simulator;
 means for obtaining measurement inertial data supplied by said inertial unit and representative of said movement after it has been executed by said movement simulator;
 theoretical modeling means for modeling said measurement inertial data supplied by said inertial unit from movement data concerning the movement really executed by said movement simulator for said movement, said theoretical modeling means supplying theoretical inertial data;
 compensation means for compensating at least one error that might falsify said theoretical modeling of said measurement inertial data by said theoretical inertial data, said compensation means being implemented upstream from said theoretical modeling means; and
 calculation means for calculating piloting commands from said simulation inertial data, said theoretical inertial data, and said measurement inertial data.

13. The validation system according to claim 12, wherein said simulation tool, each inertial unit, said theoretical modeling means, said compensation means, and said calculation means operate in real time at a clock rate determined by the clock rate of said moving body.

14. The validation system according to claim 12, wherein said compensation means comprise calibration means for calibrating at least one of said movement commands in order to compensate for the angular differences that exist between the axes of said movement simulator and the corresponding axes of said terrestrial frame of reference.

15. The validation system according to claim 12, wherein said compensation means comprise means for applying a phase advance to at least some of said movement data concerning the movement really executed by said movement simulator before supplying it to said theoretical modeling means, in order to synchronize said theoretical inertial data with said measurement inertial data.

16. The validation system according to claim 12, wherein said calculation means calculate said piloting commands as a function of inertial data I defined by I=T2+R−T1, where T2, R, and T1 respectively designate simulation inertial data, said measurement inertial data, and said theoretical inertial data.

17. The validation system according to claim 16, including diagnosis means when said inertial unit is considered as being non-valid by said validation system, and suitable for comparing accumulated sums evaluated from said measurement inertial data obtained on each iteration for said trajectory of said moving body with accumulated sums evaluated from said theoretical inertial data obtained on each iteration for said trajectory of said moving body.

18. The validation system according to claim 12, further including means for applying a phase advance to said movement commands before supplying them to said movement simulator, in order to compensate for an execution delay inherent to said movement simulator.

19. The validation system according to claim 18, wherein said movement commands present a profile that is synchronous with the profile of said really-executed movement data, and the amplitudes of said really-executed movement data and of said movement commands are consistent.

20. The validation system according to claim 19, further including, downstream from said simulation tool and upstream from said means for applying a phase advance to said movement commands, masking means fed with said movement commands and adapted to provide masked movement commands to said means for applying a phase advance to said movement commands in order to mask at least some of the stages of said movement.

21. The validation system according to claim 20, wherein at least some of said masked movement commands depend on a relationship internal to said masking means, which relationship is independent of said movement commands.

* * * * *

UNITED STATES PATENT AND TRADEMARK OFFICE
CERTIFICATE OF CORRECTION

PATENT NO. : 8,346,517 B2  
APPLICATION NO. : 12/866232  
DATED : January 1, 2013  
INVENTOR(S) : Laurent Bourzier Page 1 of 1

It is certified that error appears in the above-identified patent and that said Letters Patent is hereby corrected as shown below:

On title page, item (86) §371 (c)(1), (2), (4) Date filing date:  
replace "February 6, 2009"  
with -- December 7, 2010 --

Signed and Sealed this  
Fifth Day of March, 2013

Teresa Stanek Rea  
*Acting Director of the United States Patent and Trademark Office*